(12) United States Patent
Jimenez et al.

(10) Patent No.: US 8,066,864 B2
(45) Date of Patent: Nov. 29, 2011

(54) CROSSLINKED POLYMERS, GALVANIZATION BATHS COMPRISING THEM AND USE THEREOF

(75) Inventors: Alexander Jimenez, Bergisch Gladbach (DE); Thorsten Kühler, Bad Salzuflen (DE)

(73) Assignee: Coventya GmbH, Gutersloh (DE)

( * ) Notice: Subject to any disclaimer, the term of this patent is extended or adjusted under 35 U.S.C. 154(b) by 678 days.

(21) Appl. No.: 12/096,898

(22) PCT Filed: Dec. 15, 2006

(86) PCT No.: PCT/EP2006/012124
§ 371 (c)(1), (2), (4) Date: Nov. 20, 2008

(87) PCT Pub. No.: WO2007/073890
PCT Pub. Date: Jul. 5, 2007

(65) Prior Publication Data
US 2009/0205969 A1    Aug. 20, 2009

(30) Foreign Application Priority Data
Dec. 15, 2005    (DE) .......................... 10 2005 060 030

(51) Int. Cl.
| | |
|---|---|
| C08G 71/02 | (2006.01) |
| C08G 73/02 | (2006.01) |
| C08G 73/06 | (2006.01) |
| C25D 3/56 | (2006.01) |
| C25D 3/02 | (2006.01) |
| C25D 3/12 | (2006.01) |
| C25D 3/20 | (2006.01) |
| C25D 3/22 | (2006.01) |
| C25D 3/30 | (2006.01) |

(52) U.S. Cl. ........ 205/238; 205/255; 205/259; 205/261; 205/269; 205/270; 205/271; 205/300; 205/302; 205/305; 528/367; 528/390; 528/397; 528/422

(58) Field of Classification Search .................. 205/255, 205/259, 261, 269, 270, 271, 300, 302, 305; 528/367, 390, 397, 422
See application file for complete search history.

(56) References Cited

U.S. PATENT DOCUMENTS
4,157,388 A    6/1979    Christiansen
(Continued)

FOREIGN PATENT DOCUMENTS
DE    19840019 C1    3/2008
(Continued)

*Primary Examiner* — Randy Gulakowski
*Assistant Examiner* — Rachel Kahn
(74) *Attorney, Agent, or Firm* — Leydig, Voit & Mayer, Ltd.

(57) ABSTRACT

The invention relates to polymers which comprise at least partially cross-linked main chains constructed from repeat units of the general formula I

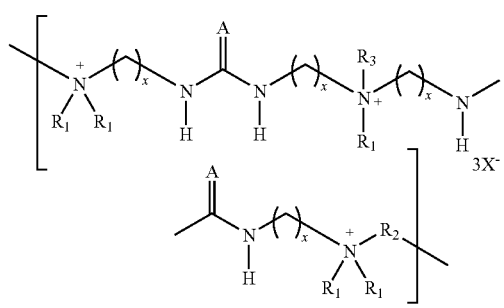

and possibly repeat units of the general formula II

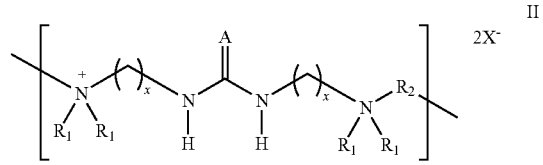

and also possibly repeat units comprising five- or six-membered aza aromatics or nitrogen-containing heterocycles. Polymers of this type are used as additive in electroplating baths since these enable a better layer thickness distribution of the electroplated layer.

20 Claims, 4 Drawing Sheets

U.S. PATENT DOCUMENTS

| | | |
|---|---|---|
| 5,405,523 A | 4/1995 | Eckles |
| 5,435,898 A | 7/1995 | Commander et al. |
| 6,652,728 B1 | 11/2003 | Sonntag et al. |
| 2004/0084322 A1 | 5/2004 | Ludwig et al. |

FOREIGN PATENT DOCUMENTS

| | | |
|---|---|---|
| EP | 1 075 553 B1 | 5/2004 |
| WO | 01/92605 A1 | 12/2001 |
| WO | 2005/093132 A1 | 10/2005 |

CROSSLINKED POLYMERS, GALVANIZATION BATHS COMPRISING THEM AND USE THEREOF

The invention relates to polymers which comprise at least partially cross-linked main chains constructed from repeat units of the general formula I

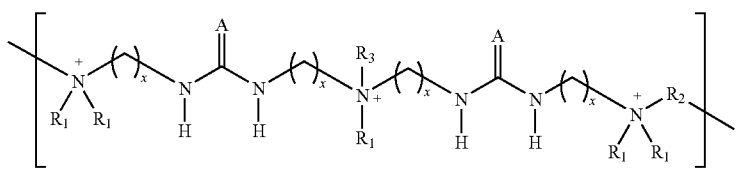

and possibly repeat units of the general formula II

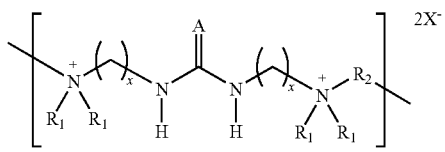

and also possibly repeat units comprising five- or six-membered aza aromatics or nitrogen-containing heterocycles. Polymers of this type are used as additive in electroplating baths since these enable a better layer thickness distribution of the electroplated layer.

For electroplating coating of components with zinc, three basically different methods have been known for many years. A distinction is made between acidic, alkaline cyanide and alkaline cyanide-free baths.

Glossy zinc layers with a current yield of 100% independently of the current density are deposited from acidic baths. This leads to the fact that, on geometrically complicated components, a very non-uniform distribution of the layer thickness is achieved.

Alkaline baths do not display this disadvantage so greatly since the current yield here reduces with increasing current density. Cyanide baths are in the meantime extensively rejected for reasons of environmental protection and operating safety. For the zinc-plating of geometrically complicated components, the coating comprising alkaline cyanide-free electrolytes has therefore gained acceptance for several years.

From simple zincate solutions, only rough, dendritic zinc deposits can be deposited which are not suitable for industrial application. Therefore polymer reaction products of amines and epichlorohydrin are added to these baths as so-called crystalline refiners. However, such baths suffer from a restriction in the applicable current densities and metal concentrations and frequently lead to low current yields.

These simple amine-epichlorohydrin conversion products are replaced in modern methods by the use of polymers which contain urea groups in order to achieve a further improvement in the layer thickness distribution and also in the applicable current densities and metal concentrations. U.S. Pat. No. 5,405,523 and U.S. Pat. No. 5,435,898 describe the use of corresponding polymers as additives in alkaline baths for the deposition of zinc- and zinc alloy layers. These compounds are based on the following general formula I:

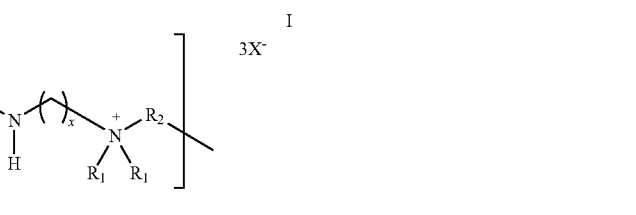

Formula 1

A = O, S, NH
x = 2, 3
R1, 2, 3, 4 = Me, Et, $^{i}$Pr, HO—CH$_2$—CH$_2$, (CH$_2$)$_2$—[O—(CH$_2$)$_2$)]$_y$OH ( y = 0-6)
R5 = CH$_2$—CH(OH)—CH$_2$, (CH$_2$)$_2$—O—(CH$_2$)$_2$,
(CH$_2$)$_2$—O—(CH$_2$)$_2$—O—(CH$_2$)$_2$,
CH$_2$—CH(OH)—CH$_2$—O—CH(OH)—CH$_2$,
CH$_2$—O—(CH$_2$)$_2$

A compound of this type which is frequently used in zinc electroplating is Mirapol WT by Rhodia with A=O, x=3, R1=R2=R3=R4=Me and R5=(CH$_2$)$_2$—O—(CH$_2$)$_2$.

The production of such compounds is described inter alia in U.S. Pat. No. 4,157,338.

In recent times, additives for deposition of zinc- and zinc alloy layers have been proposed which, instead of the ether function, have an alkylene spacer for cross-linking the ammonium units. The production and use of these additives of the general formula 2 are described in DE 198 40 019 C1 and in EP 1 075 553 B1.

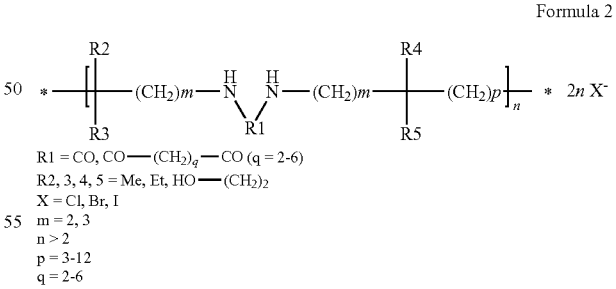

Formula 2

R1 = CO, CO—(CH$_2$)$_q$—CO (q = 2-6)
R2, 3, 4, 5 = Me, Et, HO—(CH$_2$)$_2$
X = Cl, Br, I
m = 2, 3
n > 2
p = 3-12
q = 2-6

A compound of this type with R1=CO, R2=R3=R4=R5=Me, m=3 and p=3 is sold under the trade name BC915 by the company BrookChem.

It is common to all these additives that additives are hereby involved which are based on linear polymer systems. In the case of the additives known from the state of the art, the problem of achieving an improvement in the layer thickness distribution with simultaneously acceptable current densities can only be resolved with great difficulty. Also the additives known from the state of the art cannot deliver completely satisfactory results in this respect.

Starting herefrom, it was the object of the present invention to provide suitable compounds as additive, which enable an improved layer thickness distribution with as high as possible a current density and as high as possible a metal concentration in the electroplating bath.

This object is achieved by the generic polymer, the method for production thereof, and the generic electroplating bath described herein. Further advantageous developments and uses of the polymer according to the invention are provided.

According to the invention, a polymer is provided, having at least partially cross-linked polymeric main chains constructed from repeat units of the general formula I

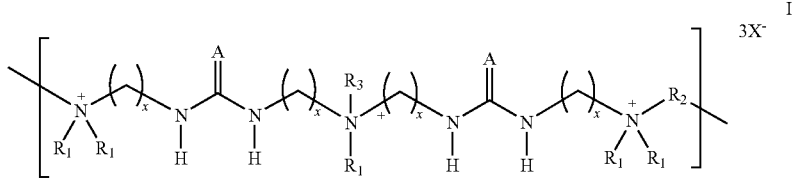

and possibly from repeat units of the general formula II

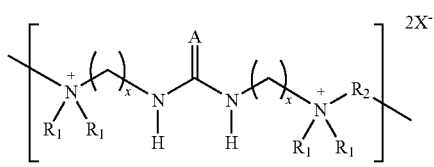

with
A selected from the group consisting of O, S and NH,
$R_1$, respectively independently of each other, straight-chain or branched $C_1$ to $C_8$ alkyl, straight-chain or branched $C_1$ to $C_8$ hydroxyalkyl and straight-chain or branched $C_1$ to $C_8$ hydroxyalkoxy,
$R_2$, respectively independently of each other, straight-chain or branched $C_1$ to $C_8$ alkylene, straight-chain or branched $C_1$ to $C_8$ hydroxyalkylene and straight-chain or branched $C_1$ to $C_8$ hydroxyalkoxy,
$R_3$, respectively independently of each other, straight-chain or branched $C_1$ to $C_8$ alkyl, straight-chain or branched $C_1$ to $C_8$ hydroxyalkyl, straight-chain or branched $C_1$ to $C_8$ hydroxyalkoxy, straight-chain or branched $C_1$ to $C_8$ alkylene, straight-chain or branched $C_1$ to $C_8$ hydroxyalkylene, straight-chain or branched $C_1$ to $C_8$ alkyleneoxy, a repeat unit of the general formulae II or III and/or a single bond,
$X^-$ an ion which is suitable as counter-ion to the quaternary ammonium ion and
x=2 or 3,
and also possibly comprising repeat units of the general formula III,

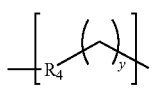

$R_4$ being selected from the group of five- or six-membered aza aromatics with at least two nitrogen atoms or the substituted derivatives thereof, y=1 to 6. It is likewise possible that $R_4$ is a nitrogen-containing heterocycle with at least two nitrogen atoms. There may thereby be contained from 10 to 300 repeat units of the general formula I and from 0 to 300 repeat units of the general formulae II and III in the polymer according to the invention.

The present polymer is now distinguished, relative to the additives known from the state of the art, in that a cross-linking of the main chains exists over at least respectively one of the radicals $R_3$ of two repeat units of the general formula I.

In other words, two main chains with respectively repeat units of the formula I contained therein can be bridged respectively via the radicals $R_3$, i.e. cross-linked. The radical $R_3$ is then in one case a single bond, in the other case, a group according to $R_2$, e.g. an alkylene group. Cross-linking of two or more main chains to each other can thereby be effected respectively at the position $R_3$ of the respective repeat units of the general formula I.

Surprisingly, it was able to be shown that polymers which have the structure according to the invention have significantly improved properties with respect to the layer thickness distribution in electroplating baths. The polymers according to the invention differ from the state of the art in that they have branches after the polycondensation and form networks. These branched polymers are able positively to influence the layer thickness distribution even at smaller concentrations than in the case of those polymer additives known from the state of the art or to enable a better layer thickness distribution.

In a further preferred embodiment, the radicals $R_1$, respectively independently of each other, are selected from the group consisting of methyl, ethyl, isopropyl, 2-hydroxyethyl and —$(CH_2)_2[O—(CH_2)_2]_z$—OH with z=0 to 6.

Both the aza aromatics and the nitrogen-containing heterocycles can thereby be substituted by at least one radical $R_7$ selected from the group of straight-chain or branched $C_1$-$C_8$ alkyls or other heteroatoms, such as e.g. sulphur or oxygen atoms. The aza aromatic is thereby preferably selected from the group consisting of imidazole pyrazole, pyrazidine pyrimidine, pyrazine, triazine and tetrazine. The nitrogen-containing heterocycle is for example piperazine or imidazolidine.

A particularly preferred embodiment of the polymer is based on the general formula I, A=O, $R_1$ respectively=methyl and $R_2$, respectively independently of each other, being selected from the group consisting of straight-chain or branched $C_1$ to $C_8$ alkylene, straight-chain or branched $C_1$ to $C_8$ hydroxyalkylene and straight-chain or branched $C_1$ to $C_8$ alkyleneoxy. $R_3$ can thereby have the above-mentioned meaning.

Via each $3^{rd}$ to each $20^{th}$, in particular each $3^{rd}$ to each $13^{th}$, radical $R_1$ of a repeat unit of the general formula I, a cross-linking of the main chains is thereby effected.

The polymer according to the invention preferably has an average molecular weight in the range of 1000 to 200,000 g/mol, preferably from 10,000 to 100,000 g/mol.

As $X^-$, there may be considered all ions suitable as counterion, halogenides, in particular $Cl^-$, $Br^-$ or $I^-$, being preferred here. According to the invention, a method for producing the polymer according to the invention is likewise provided, in which, in a first step, urea or the heteroanalogues thereof of the general formula IV

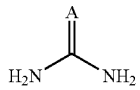

IV with A selected from the group consisting of O, S, NH, with an N,N-dialkylaminoalkylamine of the general formula V,

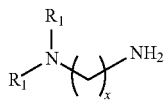

V and an N,N-bis-(aminoalkyl)-alkylamine of the general formula VI

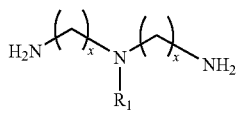

VI with $R_1$, respectively independently of each other, selected from the group consisting of straight-chain or branched $C_1$ to $C_8$ alkyl, straight-chain or branched $C_1$ to $C_8$ hydroxyalkyl and straight-chain or branched $C_1$ to $C_8$ hydroxyalkoxy is converted with formation of di- and tri-tert-amine compounds and the reaction product is converted, in a second step, with an alkyldihalogenide of the general formula VII

 VII

Preferably, the conversion is effected, in the first step, at temperatures in the range of 100 to 300° C. with agitation, ammonia which forms being able to be discharged in addition.

In the second step, the di- and tri-tert-amine compounds are preferably dissolved in water and the alkyldihalogenide is added subsequently slowly with agitation at temperatures in the range of 60 to 200° C.

According to the invention, an electroplating bath for the galvanic deposition of metals and/or metal alloys is likewise provided. This contains at least one metal ion and hydroxide ion suitable for galvanic deposition. It is essential for the invention that the electroplating bath contains in addition a polymer according to the invention as additive, as described above.

Preferably, zinc ions are contained in the electroplating bath so that the electroplating bath can be used for zinc deposition. Further metal ions which can be contained in the electroplating bath are cobalt, nickel, manganese, iron and tin ions.

Preferably, the electroplating bath has a concentration of the polymer of 0.1 to 5 g/l, in particular of 0.3 to 1.5 g/l.

Of course, the electroplating bath can contain further additives known from the state of the art. Common additives are for example aromatic aldehydes, polyvinyl alcohols, quaternary pyridinium compounds, quaternary nicotinates, polyglycols and derivatives thereof, aliphatic polyamines, aliphatic polymers with tertiary and quaternary nitrogen atoms, reaction products of aliphatic and aromatic amines with epichlorohydrin, complexing agents, gluconates, citrates, tartrates, silicates, thio compounds and amino alcohols, such as DEA, TEA or monoethanolamine.

The polymer according to the invention is used as additive in the galvanic deposition of metals and/or metal alloys.

The subject according to the invention is intended to be explained in more detail with reference to the subsequent Figures and examples without wishing to restrict the latter to the special embodiments described here.

EXAMPLE 1

Preparation of the Precursor B (m)

Figure 1:
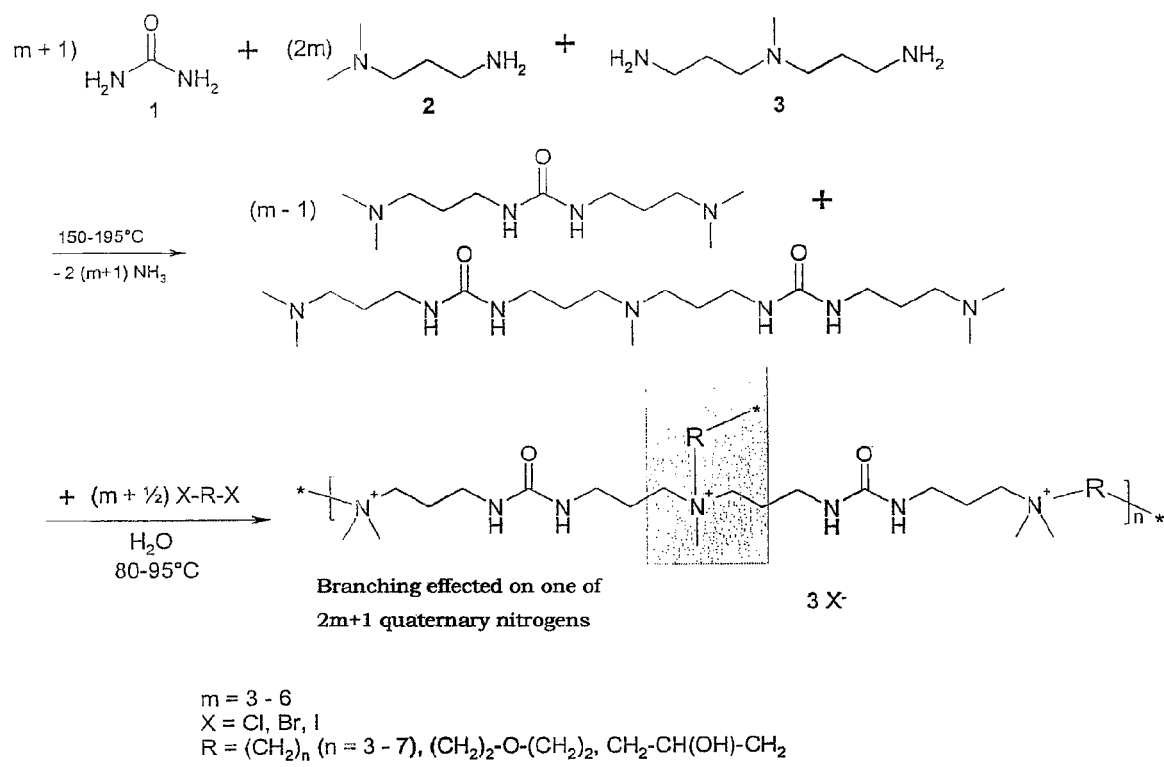
FIG. 1 shows a reaction diagram for the production of polymers according to the invention.

(m+1) $n_0$ mol urea,
(2 m) $n_0$ mol N,N-dimethylaminopropylamine
$n_0$ mol N,N-bis-(aminopropyl)-methylamine
are heated with vigorous agitation within 3 h to 150-160° C., subsequently for 90 min. to approx. 200° C. (internal temperature).

The ammonia produced from approx. 100° C. is dissipated via the cooler. (At the end of the reaction, any ammonia still present in the reaction mixture, non-converted educt and also urea formed at the bottom in the cooler can be removed by heating (>120° C.) in the high/water jet vacuum).

B (m) is obtained as slightly yellow highly viscous liquid (see Table 1).

TABLE 1

| | Urea M = 60.06 g/mol (m + 1) $n_0$ | | N,N-dimethylamino-propylamine M = 102.18 g/mol (2 m) $n_0$ | | N,N-bis-(aminopropyl)-methylamine M = 145.25 g/mol $n_0$ (const.) | | Batch size (Σ liquid vol.) | Mass (100%) precursor B (m) = [(m − 1) M(4a) + M (4b)] $n_0$ |
|---|---|---|---|---|---|---|---|---|
| m | mol | g | mol | g | mol | g | ml | g |
| 3 | 0.4 | 24.02 | 0.6 | 61.31 | 0.1 | 14.53 | 90 | 86.23 |
| 4 | 2.0 | 120.12 | 3.2 | 326.98 | 0.4 | 58.10 | 459 | 437.05 |
| 6 | 0.7 | 42.04 | 1.2 | 122.62 | 0.1 | 14.53 | 164 | 155.34 |
| 10 | 0.55 | 33.03 | 1.0 | 102.18 | 0.05 | 7.26 | 133 | 123.74 |

EXAMPLE 2

Preparation of Cross-Linked Additives

The di-/tri-tert-amine compound (precursor B (m)) is dissolved in water (The water quantity is chosen such that the product is obtained in the form of an approx. 40% solution) and heated to 70-95° C. The dihalogenide is added with agitation within approx. 40 min., the bath temperature is increased after 1 h agitation for a further 3 h to 100-105° C. (subsequently, excess dihalogenide can be distilled off, if required, as azeotrope with water).

A colourless to yellow viscous liquid, according to the water content, is obtained (see Table 2).

TABLE 2

| | Di-/tri-tert-amine compound | | | Dihalogen compound | |
|---|---|---|---|---|---|
| | | tert. N- atoms: | mass B (m) = [(m − 1) M | $(m + \frac{1}{2})$ | mass |
| No. | M | $n_0$ | $(2m + 1) n_0$ | $(4a) + M (4b)] n_0$ | $n_0$ | |
| 1 | 3 | 0.029 mol | 0.20 mol | 24.64 g | 0.10 mol | 14.30 g BCEE |
| 2 | | | | | | 15.51 g DCH |
| 3 | | | | | | 24.40 g DBH |
| 4 | | 0.116 mol | 0.81 mol | 100 g | 0.41 mol | 63.80 g TMCB |
| 5 | 4 | 0.05 mol | 0.45 mol | 54.63 g | 0.225 mol | 32.18 g BCEE |
| 6 | | | | | | 34.89 g DCH |
| 7 | | | | | | 54.90 g DBH |
| 8 | | 0.044 mol | 0.40 mol | 50 g | 0.20 mol | 32.40 g TMCB |
| 9 | 6 | 0.015 mol | 0.20 mol | 23.90 g | 0.10 mol | 14.30 g BCEE |
| 10 | 10 | 0.010 mol | 0.20 mol | 23.57 g | 0.10 mol | 14.30 g BCEE |

BCEE = bis(2-chloroethyl)ether, DCH = 1,6-dichlorohexane, DBH = 1,6-dibromohexane, TMCB = 1-bromo-3-chloropropane In order to examine the properties of the additives, different comparative experiments were implemented. The implementation and the results are described in examples 4 to 7.

EXAMPLE 3

Preparation of Cross-Linked Polymers with Heterocyclic Repeat Units

The di-/tri-tert-amine compound and the heterocyclic compounds are dissolved in water (the water quantity is chosen such that the product is obtained in the form of an approx. 40% solution) and is heated to approx. 70 to 95° C. The dihalogenide is added with agitation within approx. 60 min., the bath temperature is increased after approx. 1 h agitation for a further 3 h to approx. 100 to 105° C. (subsequently, any excess dihalogenide can be distilled off, if required, as azeotrope with water).

A colourless to yellow viscous liquid, according to the water content, is obtained (see Table 3).

TABLE 3

| | di-/tri-tert-amine compound | | | | Heterocycle | | Dihalogen Compound | |
|---|---|---|---|---|---|---|---|---|
| | | | tert. N- atoms $(2m + 1)$ | mass | | | | |
| No. | m | n/mol | n/mol | B (m) | n/mol | mass | n/mol | mass |
| 11 | 3 | 0.029 | 0.2 | 24.7 g | 0.02 | 2.3 g N,N'-dimethyl-piperazine | 0.1 | 15.7 g TMCB |
| 12 | 4 | 0.044 | 0.4 | 50 g | 0.037 | 2.5 g imidazole | 0.2 4 | 38 g TMCB |

EXAMPLE 4

Composition of the Electrolyte

| | |
|---|---|
| sodium hydroxide NaOH | 125 g/l |
| zinc oxide ZnO | 17.4 g/l (corresponds to 14 g/l zinc) |
| stabiliser | 20 ml/l |
| gloss additive | 0.5 ml/l |
| additives to be tested (40% solutions) | 4 ml/l |

Implementation of the $H_{ULL}$ Cell Test:

The thoroughly mixed electrolyte is added to the $H_{ULL}$ cell. A zinc-plated steel-$H_{ULL}$ cell metal sheet is de-zinced with half-concentrated hydrochloric acid, degreased anodically for 2 min. at 6 A and pickled for 20 s with 10% sulphuric acid. After each pre-treatment step, it is washed thoroughly with water. The metal sheet is coated in the $H_{ULL}$ cell for 15 min. at 1 A (room temperature). A steel anode which was pickled in advance in half-concentrated hydrochloric acid serves as anode. After the electroplating, the metal sheet is washed with deionised water, lightened for 5 s in 0.5% nitric acid, washed again with deionised water and dried with blotting paper.

The layer thickness is determined with X-ray fluorescence spectroscopy at two measuring points. The first measuring point is 2.5 cm away from the left edge of the metal sheet, the second 8.5 cm. The ratio of the layer thickness at the second to that at the first measuring point is a measure of the throwing power of the electrolyte. The higher is this value, the better is the metal distribution. At a value of 1, the layer thickness is the same in almost the entire current density region. The results are presented in Table 4.

TABLE 4

| No. | Additive from test no. | Degree of gloss | Throwing capacity |
|---|---|---|---|
| 13 | Mirapol WT (60%) | semi-glossy | 0.44 |
| 14 | Mirapol WT (40%) | semi-glossy | 0.49 |
| 15 | 1 (40%) | glossy | 0.71 |
| 16 | 2 (40%) | matt, cloudy | 0.87 |
| 17 | 5 (52%) | glossy | 0.56 |
| 18 | 6 (62%) | matt, cloudy | 1.00 |
| 19 | 9 (40%) | glossy | 0.61 |
| 20 | 10 (40%) | glossy | 0.59 |

In comparison with Mirapol WT, all the tested additives display an improvement in the metal distribution/throwing capacity.

EXAMPLE 5

Composition of the Electrolyte

| | |
|---|---|
| sodium hydroxide NaOH | 120 g/l |
| zinc oxide $Zn^{2+}$ | 10.5 g/l |
| $Na_2EDTA$ (10%) | 4 ml/l |
| thiourea (90 g/l) | 0.8 ml/l |
| additive (as solid substance) | 600 mg/l |

The metal sheets are coated analogously to the above-described test for 10 minutes at 2 A. The results are displayed in Table 5. In order to determine the properties of the additives, the layer thickness is determined at two measuring points 2.5 cm and 7.5 cm from the left edge of the metal sheet. The layer thicknesses at point 1 and point 2 are compared as a measure of the metal distribution. The lower the ratio r, the better is the metal distribution.

TABLE 5

| No. | Additive from test no. | Degree of gloss | r |
|---|---|---|---|
| 21 | Mirapol WT | semi-glossy | 1.55 |
| 22 | BC 915 | semi-glossy | 1.72 |
| 23 | 1 | glossy | 1.11 |
| 24 | 5 | semi-glossy | 1.33 |
| 25 | 8 | semi-glossy | 1.60 |

The metal distribution in all the tested additives is better than in the comparative substances.

EXAMPLE 6

Composition of the Electrolyte

| | |
|---|---|
| sodium hydroxide NaOH | 120 g/l |
| zinc $Zn^{2+}$ | 10.5 g/l |
| $Na_2EDTA$ (10%) | 4 ml/l |
| thiourea (90 g/l) | 0.8 ml/l |
| additive (as solid substance) | 600 mg/l |
| N-benzyl nicotinate betaine (3.6%) | 4 ml/l |

Figure 2:
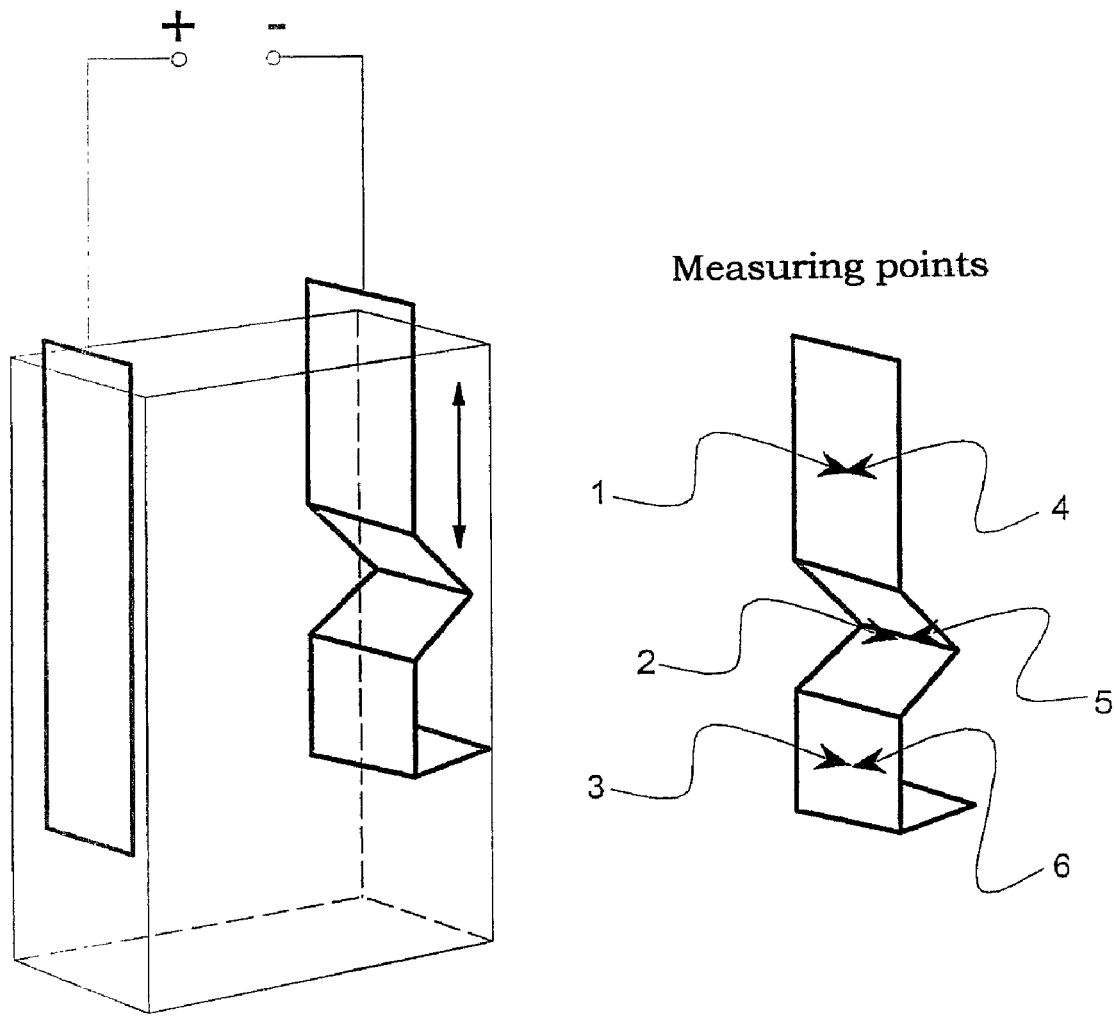
FIG. 2 shows the test-wise construction for a jiggle-cell for examining the layer thickness distribution, with reference to a sketch.

Implementation of the Test in the Jiggle Cell:

Test sheets were coated in a so-called jiggle cell for 30 min. at 3 A. The test structure is sketched in FIG. 2. The electrolyte volume is 1 litre. The cathode metal sheet concerns a steel sheet of 20 cm total length and 3.5 cm width which is bent, as indicated in the sketch. The cathode is moved vertically during coating. A steel anode serves as anode. After the coating, the zinc-plated steel sheets are washed with deionised water, lightened for 15 s in 0.5% nitric acid, washed again with deionised water and dried with blotting paper.

The layer thickness is measured on the side of the metal sheet which is orientated towards the anode and that which is orientated away from the anode at the points sketched in the illustration.

Figure 3:
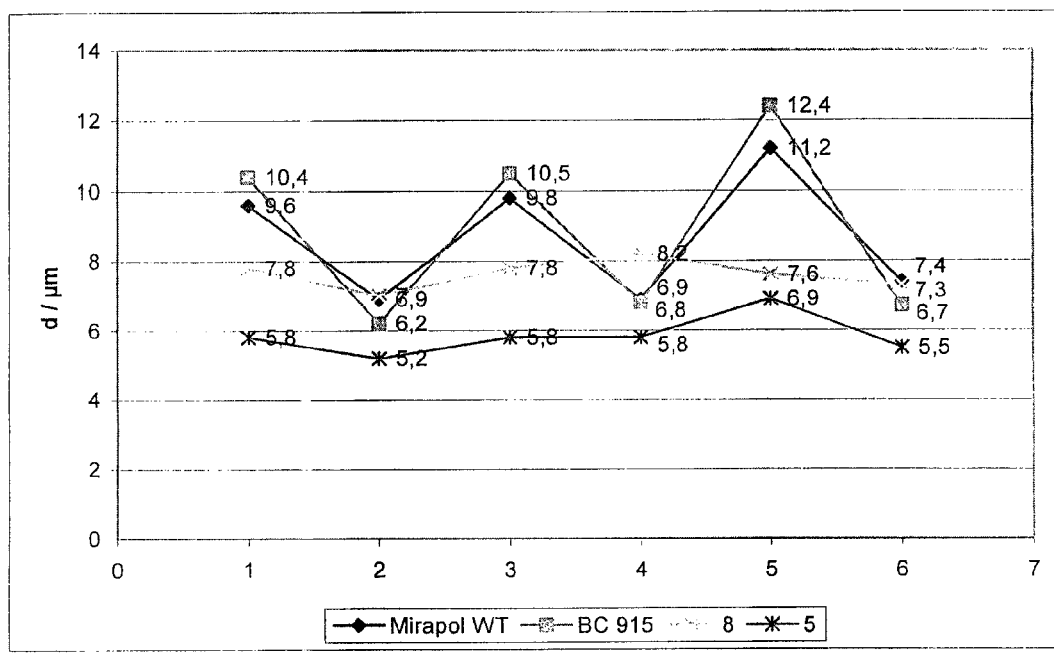
FIG. 3 shows, with reference to a diagram, the comparison of additives according to the invention relative to additives known from the state of the art with respect to the layer thickness.

In the described manner, the comparative substances Mirapol WT and BC 915 and also the substances from tests no. 5 and no. 8 were examined. The results of the layer thickness measurement are represented graphically in FIG. 3. A substantially more uniform distribution of the layer thickness over the metal sheet is detected clearly when using the compounds according to the invention.

EXAMPLE 7

Composition of the Electrolyte

| | |
|---|---|
| sodium hydroxide NaOH | 120 g/l |
| zinc $Zn^{2+}$ | 12 g/l |
| Performa 260 brightener RAC | 0.5 ml/l |
| Performa 260 stabiliser | 75 ml/l |
| Performa 260 base Fe | 2.5 ml/l |
| additive (as solid substance) | 800 mg/l |

Figure 4:
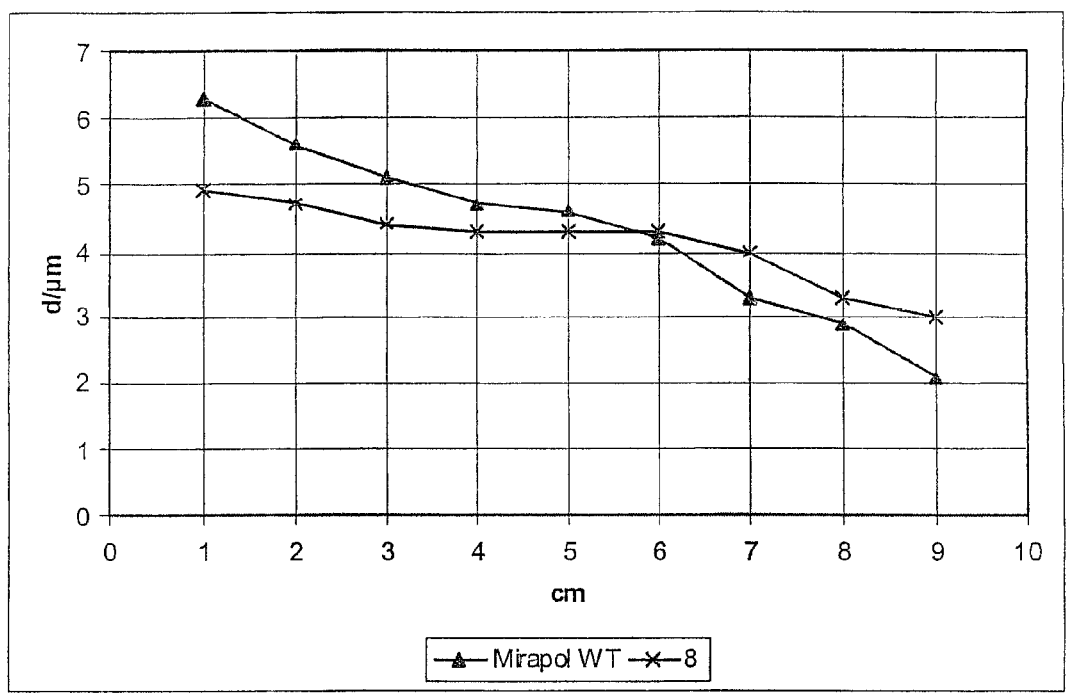
FIG. 4 shows the layer thickness distribution for a polymer according to the invention and also for a polymer known from the state of the art.

Implementation of the Hull-Cell Test for Deposition of Zinc-Iron Alloy Layers:

Hull-cell metal sheets are coated analogously to the test described in example 4 for 15 min. at 2 A. The layer thickness is measured at 9 measuring points on the metal sheet at a spacing respectively of 1, 2, 3, 4, 5, 6, 7, 8 and 9 cm from the left edge. The result of the test for the compound of test 8 and Mirapol WT is presented for comparison in FIG. 4. It is detected that, when using the compound according to the invention, a significantly better metal distribution is achieved. In addition, the current yield in the range of the low current density is better than when using Mirapol WT (measuring point 7, 8, 9).

The invention claimed is:

1. A polymer having at least partially cross-linked polymeric main chains constructed from repeat units of the general formula I

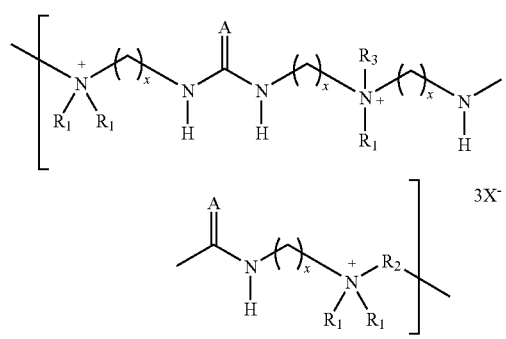

and optionally repeat units of the general formula II with

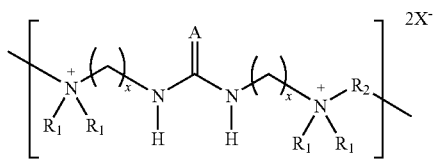

A selected from the group consisting of O, S, and NH, $R_1$, respectively independently of each other, selected from the group consisting of straight-chain or branched $C_1$ to $C_8$ alkyl, straight-chain or branched $C_1$ to $C_8$ hydroxyalkyl and straight-chain or branched $C_1$ to $C_8$ hydroxyalkoxy and $R_2$, respectively independently of each other, selected from the group consisting of straight-chain or branched $C_1$ to $C_8$ alkylene, straight-chain or branched $C_1$ to $C_8$ hydroxyalkylene and straight-chain or branched $C_1$ to $C_8$ alkyleneoxy, $R_3$, respectively independently of each other, $R_1$, $R_2$, a repeat unit of the general formula II or III and/or a single bond, $X^-$, respectively independently of each other, an ion which is suitable as counter-ion to the quaternary ammonium ion, x=2 or 3, and also optionally repeat units of the general formula III

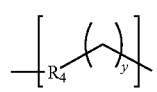

$R_4$ being selected from the group of five- or six-membered aza aromatics or nitrogen-containing heterocycles with at least two nitrogen atoms or the substituted derivatives thereof and y=1 to 6, wherein via at least respectively one of the radicals $R_3$ of two repeat units of the general formula I, a cross-linking of the main chains exists.

2. The polymer according to claim 1, wherein $R_1$, respectively independently of each other, is selected from the group consisting of methyl, ethyl, isopropyl, 2-hydroxyethyl and —$(CH_2)_2$—[O—$(CH_2)_2$]$_z$—OH with z=0 to 6.

3. The polymer according to claim 1, wherein the aza aromatic is selected from the group consisting of imidazole, pyrazole, pyrazidine, pyrimidine, pyrazine, triazine and tetrazine.

4. The polymer according to claim 1, wherein the aza aromatic and/or the nitrogen-containing heterocycle is substituted by at least one radical $R_7$ selected from the group of straight-chain and branched $C_1$-$C_8$ alkyls and/or has further heteroatoms.

5. The polymer according to claim 1, wherein the nitrogen-containing heterocycle is piperazine or imidazolidine.

6. The polymer according to claim 1, wherein

A=O, $R_1$ respectively methyl, $R_2$, respectively, independently of each other, is selected from the group consisting of straight-chain or branched $C_1$ to $C_8$ alkylene, straight-chain or branched $C_1$ to $C_8$ hydroxyalkylene and straight-chain or branched $C_1$ to $C_8$ alkyleneoxy and $R_3$=$R_1$, $R_2$ and/or a single bond, via each $3^{rd}$ to each $20^{th}$, radical $R_3$ of two repeat units of the general formula I, a cross-linking of the main chains being present.

7. The polymer according to claim 1, wherein the polymer has an average molecular weight in the range of 1000 to 200,000 g/mol.

8. The polymer according to claim 1, wherein $X^-$ is a halogenide.

9. A method for producing a polymer according to claim 1 in which, in a first step, urea or heteroanalogues thereof of the general formula IV

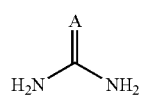

with A selected from the group comprising O, S, and NH, by reacting with an N,N-dialkylaminoalkylamine of the general formula V,

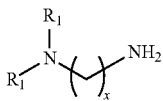

and an N,N-bis-(aminoalkyl)-alkylamine of the general formula VI

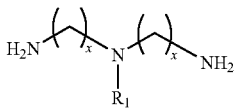

with $R_1$, respectively independently of each other, selected from the group consisting of straight-chain or branched $C_1$ to $C_8$ alkyl, straight-chain or branched $C_1$ to $C_8$ hydroxyalkyl and straight-chain or branched $C_1$ to $C_8$ hydroxyalkoxy is converted
with formation of di- and tri-tert-amine compounds and the reaction product is converted, in a second step, by reacting with an alkyldihalogenide of the general formula VII

 VII.

10. The method according to claim 9, wherein the conversion is effected, in the first step, at temperatures in the range of 100 to 300° C. with agitation and ammonia which forms is discharged.

11. The method according to claim 9, wherein in the second step, the di- and tri-tert-amine compounds are dissolved in water and the alkyldihalogenide is added subsequently slowly with agitation at temperatures in the range of 60 to 200° C.

12. An electroplating bath for the galvanic deposition of metals and/or metal alloys containing at least one metal ion, hydroxide ions, wherein a polymer according to claim 1 is contained as additive.

13. The electroplating bath according to claim 12, wherein the metal ions are zinc ions.

14. The electroplating bath according to claim 12, wherein the metal ions are selected from the group consisting of cobalt, nickel, manganese, iron and tin ions.

15. The electroplating bath according to claim 12, wherein the polymer is contained in a concentration of 0.1 to 5 g/l.

16. The electroplating bath according to claim 12, wherein the electroplating bath contains further additives.

17. The polymer according to claim 2, wherein the aza aromatic is selected from the group consisting of imidazole, pyrazole, pyrazidine, pyrimidine, pyrazine, triazine and tetrazine.

18. The polymer according to claim 2, wherein the aza aromatic and/or the nitrogen-containing heterocycle is substituted by at least one radical $R_7$ selected from the group of straight-chain and branched $C_1$-$C_8$ alkyls and/or has further heteroatoms.

19. The polymer according to claim 2, wherein the nitrogen-containing heterocycle is piperazine or imidazolidine.

20. The polymer according to claim 2, wherein
A=O,
$R_1$ respectively methyl,
$R_2$, respectively, independently of each other, is selected from the group consisting of straight-chain or branched $C_1$ to $C_8$ alkylene, straight-chain or branched $C_1$ to $C_8$ hydroxyalkylene and straight-chain or branched $C_1$ to $C_8$ alkyleneoxy and
$R_3$=$R_1$, $R_2$ and/or a single bond,
via each $3^{rd}$ to each $20^{th}$, radical $R_3$ of two repeat units of the general formula I, a cross-linking of the main chains being present.

* * * * *